United States Patent
Kuehnel et al.

(10) Patent No.: US 9,829,369 B2
(45) Date of Patent: Nov. 28, 2017

(54) ULTRASOUND LEVEL TRANSMITTER

(71) Applicants: Frank Kuehnel, Eschborn (DE); Karl-Friedrich Pfeiffer, Erlangen (DE); Manfred Roth, Grosshabersdorf (DE)

(72) Inventors: Frank Kuehnel, Eschborn (DE); Karl-Friedrich Pfeiffer, Erlangen (DE); Manfred Roth, Grosshabersdorf (DE)

(73) Assignee: Continental Automotive GmbH, Hannover (DE)

( * ) Notice: Subject to any disclaimer, the term of this patent is extended or adjusted under 35 U.S.C. 154(b) by 155 days.

(21) Appl. No.: 14/369,964

(22) PCT Filed: Dec. 20, 2012

(86) PCT No.: PCT/EP2012/076519
§ 371 (c)(1),
(2) Date: Jun. 30, 2014

(87) PCT Pub. No.: WO2013/102581
PCT Pub. Date: Jul. 11, 2013

(65) Prior Publication Data
US 2014/0352426 A1 Dec. 4, 2014

(30) Foreign Application Priority Data
Jan. 5, 2012 (DE) .................. 10 2012 200 118
Jan. 19, 2012 (DE) .................. 10 2012 200 757

(51) Int. Cl.
*G01F 23/296* (2006.01)

(52) U.S. Cl.
CPC ...... *G01F 23/2968* (2013.01); *G01F 23/2962* (2013.01)

(58) Field of Classification Search
CPC ................. G01F 23/2968; G01F 23/2962
(Continued)

(56) References Cited

U.S. PATENT DOCUMENTS 4,976,150 A * 12/1990 Deka .................. G01N 29/2437
73/644
5,172,594 A 12/1992 Dyke
(Continued)

FOREIGN PATENT DOCUMENTS

CN 1161450 10/1997
CN 1170990 1/1998
(Continued)

OTHER PUBLICATIONS

Office Action dated Dec. 15, 2016 which issued in the corresponding Chinese Patent Application No. 201280065986.X.

*Primary Examiner* — Natalie Huls
*Assistant Examiner* — Monica S Young
(74) *Attorney, Agent, or Firm* — Cozen O'Connor

(57) ABSTRACT

A filling level transmitter includes a sound-conducting tube and a filling level sensor. The filling level sensor has: a housing including a ceramic substrate and a metal lid soldered to the substrate, an ultrasonic transceiver arranged in the housing and having a sound-outputting region, the ultrasonic transceiver being connected by at least the sound-outputting region to the substrate, and sensor electronics arranged in the housing.

9 Claims, 1 Drawing Sheet

(58) Field of Classification Search
USPC .......................................................... 73/290
See application file for complete search history.

(56) References Cited

U.S. PATENT DOCUMENTS

| | | | | |
|---|---|---|---|---|
| 5,226,320 | A * | 7/1993 | Dages | G01F 23/2962 181/124 |
| 5,405,476 | A * | 4/1995 | Knecht | H03H 9/1014 156/292 |
| 5,697,248 | A * | 12/1997 | Brown | G01F 23/28 73/290 V |
| 5,793,705 | A * | 8/1998 | Gazis | G01F 23/296 367/98 |
| 5,852,337 | A | 12/1998 | Takeuchi et al. | |
| 6,081,064 | A * | 6/2000 | Pfeiffer | G10K 9/13 310/334 |
| 6,536,275 | B1 * | 3/2003 | Durkee | G01F 23/2962 73/290 R |
| 6,882,089 | B2 * | 4/2005 | Kashiwaya | H01L 41/0805 29/25.35 |
| 7,468,608 | B2 * | 12/2008 | Feucht | G01N 29/022 324/633 |
| 8,029,731 | B2 | 10/2011 | Krause et al. | |
| 2003/0137039 | A1 * | 7/2003 | Nakano | H03H 9/0585 257/680 |
| 2005/0284217 | A1 * | 12/2005 | Miyagawa | G01F 23/2962 73/290 V |
| 2009/0038394 | A1 * | 2/2009 | Zachmann | G01F 23/2962 73/290 V |
| 2009/0074222 | A1 * | 3/2009 | Song | H04R 19/016 381/357 |
| 2011/0115036 | A1 * | 5/2011 | Moon | B81C 1/00269 257/415 |
| 2011/0254111 | A1 | 10/2011 | Leclair et al. | |
| 2012/0192656 | A1 * | 8/2012 | Wiest | G01F 1/662 73/861.18 |
| 2014/0345377 | A1 * | 11/2014 | Jager | G01F 23/2962 73/290 V |

FOREIGN PATENT DOCUMENTS

| | | |
|---|---|---|
| CN | 2286439 | 7/1998 |
| CN | 1443299 | 9/2003 |
| CN | 102223593 | 10/2011 |
| DE | 29 700 870 | 3/1997 |
| DE | 10 130 540 | 1/2003 |
| DE | 10 2005 012 041 | 9/2006 |
| DE | 10 2006 017 284 | 10/2007 |
| DE | 10 2008 015 349 | 12/2009 |
| DE | 10 2009 060 002 | 6/2011 |
| JP | 01-173835 | 7/1989 |
| JP | 2005-201871 | 7/2005 |
| JP | 2009-031136 | 2/2009 |
| JP | 2009-190080 | 8/2009 |

* cited by examiner

ULTRASOUND LEVEL TRANSMITTER

CROSS-REFERENCE TO RELATED APPLICATIONS

This is a U.S. national stage of application No. PCT/EP2012/076519, filed on 20 Dec. 2012, which claims priority to the German Application No. 10 2012 200 118.2, filed 5 Jan. 2012, and German Application No. 10 2012 200 757.1, filed 19 Jan. 2012, the content of all are incorporated herein by reference.

BACKGROUND OF THE INVENTION

1. Field of the Invention

The invention relates to a filling level transmitter, comprising a sound-conducting tube and a filling level sensor with an ultrasonic transceiver and sensor electronics.

2. Related Art

Such filling level transmitters with an ultrasonic transceiver that generates and outputs ultrasonic waves and receives reflected ultrasonic waves are used to measure filling levels in fuel containers in motor vehicles and are therefore known. In order to protect against the aggressive components in fuels, the sound transmitter and the electronics are arranged outside the fuel container. It is disadvantageous here that for this measurement the wall of the fuel container has to be penetrated, which is problematic owing to the material of the fuel container. It is also known to arrange the transceiver in the fuel container. However, this requires encapsulation of the transceiver, wherein the encapsulation has to be configured such that the sound-outputting region of the transceiver extends into the fuel and only the remaining part of the transceiver is encapsulated. The seal necessary for this gives rise to considerable expenditure for the filling level sensor.

SUMMARY OF THE INVENTION

An object of the present invention is therefore to provide a filling level transmitter that can be arranged in a protected fashion in the fuel container, wherein the protected arrangement is to be embodied in a simple and cost-effective way, and the expenditure on mounting is low.

According to an aspect of the invention, this object is achieved in that the ultrasonic transceiver is arranged in a housing composed of a ceramic substrate and a metal lid soldered to the substrate, wherein the ultrasonic transceiver is connected by at least the sound-outputting region to the substrate.

The arrangement of the transceiver on the ceramic substrate permits reliable and secure attachment of the transceiver. The simultaneous use of the ceramic substrate as a housing component eliminates the need for an additional housing part. The ceramic substrate forms, together with the metal lid, a hermetically sealed housing and therefore provides sufficient protection with respect to the surrounding fuel.

The generation of ultrasonic waves can be brought about in a particularly simple way if the transceiver is a piezo-element, wherein, in particular, the actual sound transmitter is a piezo-ceramic wafer.

The attachment of the transceiver is particularly easy in one advantageous embodiment if the transceiver is connected to the ceramic substrate in an acoustically soft fashion. In this embodiment, the ceramic substrate forms an intermediate layer in the path of the ultrasonic waves.

An acoustically soft connection can be achieved particularly easily by bonding if the transceiver is bonded to the ceramic substrate in an elastic fashion. Basically, adhesives on a silicone, acrylate or polyurethane basis can be used for elastic bonding. The selection of the corresponding adhesive can, however, also be made as a function of the conditions of use. In this way, elastic bonding with an adhesive is obtained if the glass transmission temperature thereof is below the operating temperature of the filling level sensor.

According to another embodiment, the connection of the transceiver is technologically easy by soft soldering.

In another embodiment, the transceiver is connected to the ceramic substrate in an acoustically hard fashion, with the result that the ceramic substrate forms a composite oscillator with the transceiver. The advantage of this embodiment is that the efficiency of the outputting of sound is increased.

An acoustically hard connection can easily be obtained by bonding if the transceiver is rigidly bonded to the ceramic substrate. Adhesives on an epoxy resin, acrylate or polyurethane basis are suitable for this. However, the corresponding adhesive can also be selected as a function of the conditions of use. In this way, rigid bonding with an adhesive is obtained if the glass transition temperature thereof is above the operating temperature of the filling level sensor.

A particularly durable connection is achieved if the transceiver is connected to the ceramic by sintering. This connection is advantageous, in particular, in the case of increased requirements of the strength owing to the conditions of use.

The connection can also be produced by hard soldering as a function of the thermal load bearing capacity of the components.

In another embodiment, the housing is arranged in the sound-conducting tube such that the sound waves are parallel to the bottom of the fuel container and that the sound-conducting tube is formed such that the sound waves are subsequently deflected by 90° with respect to the surface of the liquid. As a result, the sound waves are firstly output parallel to the surface of the liquid, as a result of which the so-called dead stretch, due to the principle, of the sound transceiver is moved into the bottom region of the fuel container, with the result that the minimum measurable filling level is not influenced by this. The deflection of the sound waves through the sound-conducting tube, in order to determine the actual filling level, only occurs subsequently.

According to a further advantageous embodiment, the housing is arranged in a damped fashion in the sound-conducting tube. As a result, transmission of vibrations from the ceramic substrate to the sound-conducting tube is avoided and interfering influences on the actual measurement signal are reduced.

BRIEF DESCRIPTION OF THE DRAWINGS

The invention will be explained in more detail using an exemplary embodiment. In the drawings.

DETAILED DESCRIPTION OF THE PRESENTLY PREFERRED EMBODIMENTS

Figure 1:
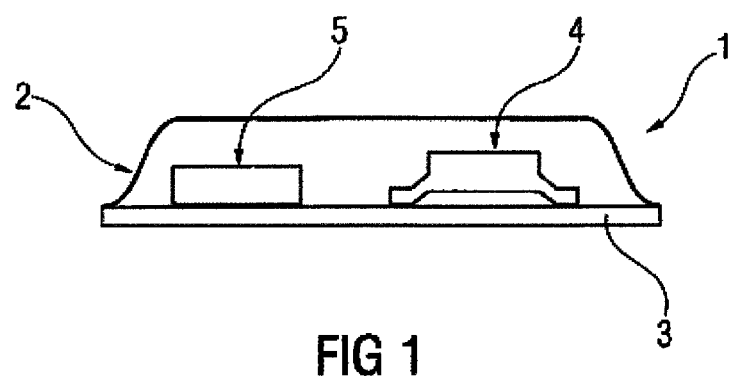
FIG. 1 shows the schematic design of the filling level sensor.

The filling level sensor in FIG. 1 is composed of a housing 1, which is formed from a metal lid 2 and a ceramic substrate 3. The metal lid 2 is soldered to the substrate 3 to form a hermetically sealed connection, wherein the substrate 3 is metalized in the regions in which the metal lid 2 rests on the substrate 3. The ceramic substrate 3 serves, in addition to its function as a housing, at the same time as a printed circuit board and carrier for sensor electronics 4 and an ultrasonic transceiver 5 for generating and emitting ultrasonic waves and for receiving ultrasonic waves, which transceiver is rigidly bonded onto the substrate 3 with an epoxy resin adhesive. In this example, the actual sound transmitter of the transceiver 5 is a piezo-ceramic wafer.

Figure 2:
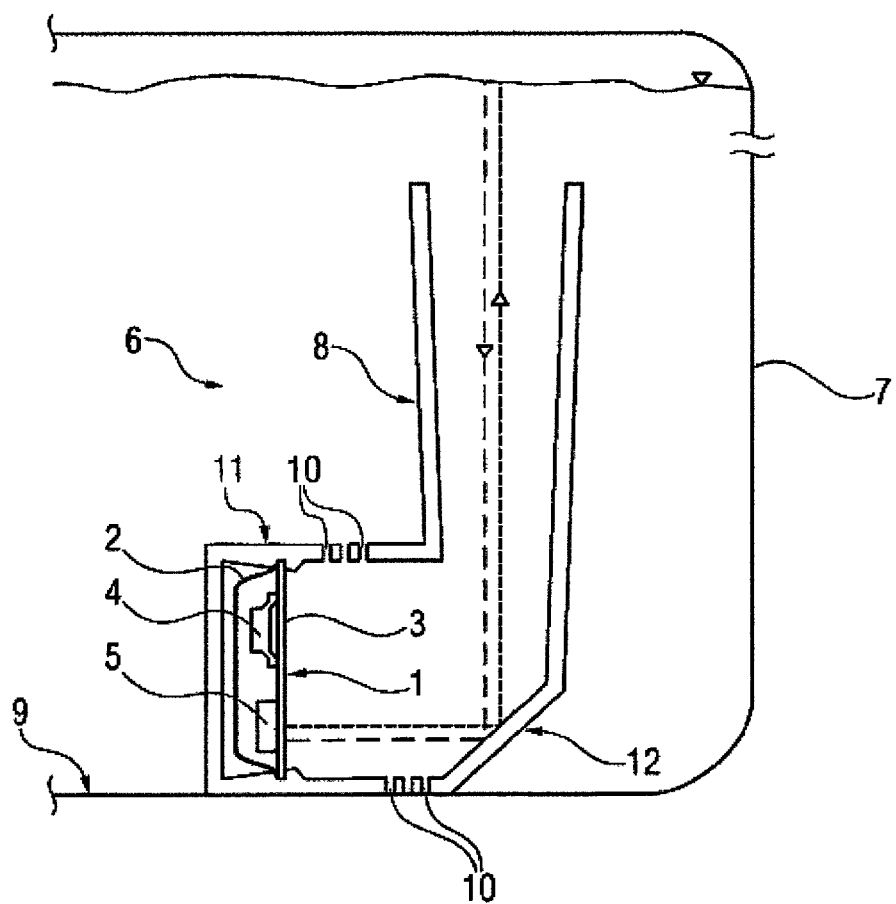
FIG. 2 shows the arrangement of a filling level transmitter in a fuel container.

FIG. 2 shows the filling level transmitter 6 in a fuel container 7. The filling level transmitter 6 is attached to the bottom 9 of the fuel container 7 via the sound-conducting tube 8. The sound-conducting tube 8 has, in the bottom region, a plurality of openings 10 via which fuel can enter the sound-conducting tube 8. In this region of the sound-conducting tube 8, the housing 1 of the filling level sensor is installed perpendicularly in the installation position with the result that the ultrasonic waves generated by the transceiver 5 are emitted through the perpendicularly arranged, ceramic substrate 3, parallel to the bottom 9 of the fuel container 7. For this purpose, the housing 1 is inserted into receptacles 11 of the sound-conducting tube 8, wherein damping elements (not illustrated in more detail) in the receptacles can minimize the transmission of vibrations to the sound-conducting tube 8. The sound waves are represented symbolically by arrows. After a distance, the sound waves strike a reflector 12 which is integrated in the sound-conducting tube 8 and which deflects the sound waves by 90° with respect to the surface of the liquid. The sound waves are reflected at the surface of the liquid run back along the same path again until they are received by the transceiver 5 and are propagated using the sensor electronics 4 such that the filling level sensor makes available an electrical signal that corresponds to the filling level and that is fed to a display device (not illustrated) for the filling level in the motor vehicle.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A filling level transmitter (6) that measures a filling level of a liquid in a fuel container (7) having a bottom (9), the filling level transmitter comprising: a sound-conducting tube (8) having:

a first portion, having a central axis, arranged parallel to the bottom (9),
a second portion, arranged perpendicular both to the bottom (9) and the central axis,
and a reflector (12) configured to deflect sound waves by 90° with respect to a surface of the liquid; and a filling level sensor, the filling level sensor having:
a housing (1) including a ceramic substrate (3) and a metal lid (2) soldered to the ceramic substrate (3), an ultrasonic transceiver (5) arranged in the housing and having a sound-outputting region, the ultrasonic transceiver (5) being connected by at least the sound-outputting region to the ceramic substrate (3), and sensor electronics (4) arranged in the housing (1), wherein the ceramic substrate (3) is a printed circuit board and carrier for the sensor electronics (4) and the ultrasonic transceiver (5), and the metal lid (2) is arranged with respect to the ceramic substrate (3) so as to cover the sensor electronics (4) and the ultrasonic transceiver (5),
wherein the filling level transmitter is arranged in the fuel container (7) containing the liquid and having the bottom (9),
wherein the housing (1) is arranged in the first portion of the sound-conducting tube (8) such that sound waves output by the ultrasonic transceiver (5) travel parallel to the bottom (9) of the fuel container (7), and the sound-conducting tube (8) is configured such that the sound waves output by the ultrasonic transceiver (5) are subsequently deflected, by the reflector (12), by 90° with respect to the surface of the liquid, and wherein the ultrasonic transceiver (5) is arranged such that sound waves output by the ultrasonic transceiver (5) introduced into the sound-conducting tube (8) are offset from the central axis of the first portion of the sound-conducting tube (8).

2. The filling level transmitter as claimed in claim 1, wherein the ultrasonic transceiver (5) is a piezo-element.

3. The filling level transmitter as claimed in claim 1, wherein the ultrasonic transceiver (5) is connected to the ceramic substrate (3) in an acoustically soft fashion.

4. The filling level transmitter as claimed in claim 3, wherein the ultrasonic transceiver (5) is soldered to the ceramic substrate (3) in a soft fashion.

5. The filling level transmitter as claimed in claim 3, wherein the ultrasonic transceiver (5) is bonded to the ceramic substrate (3) in an elastic fashion.

6. The filling level transmitter as claimed in claim 1, wherein the ultrasonic transceiver (5) is connected to the ceramic substrate (3) in an acoustically hard fashion.

7. The filling level transmitter as claimed in claim 6, wherein the ultrasonic transceiver (5) is bonded to the ceramic substrate (3) in a rigid fashion.

8. The filling level transmitter as claimed in claim 6, wherein the ultrasonic transceiver (5) is connected to the ceramic substrate (3) by sintering.

9. The filling level transmitter as claimed in claim 1, wherein the housing (1) is arranged in the sound-conducting tube (8) via receptacles (11) of the the sound-conducting tube (8) in a damped fashion.

\* \* \* \* \*